Figure 1:
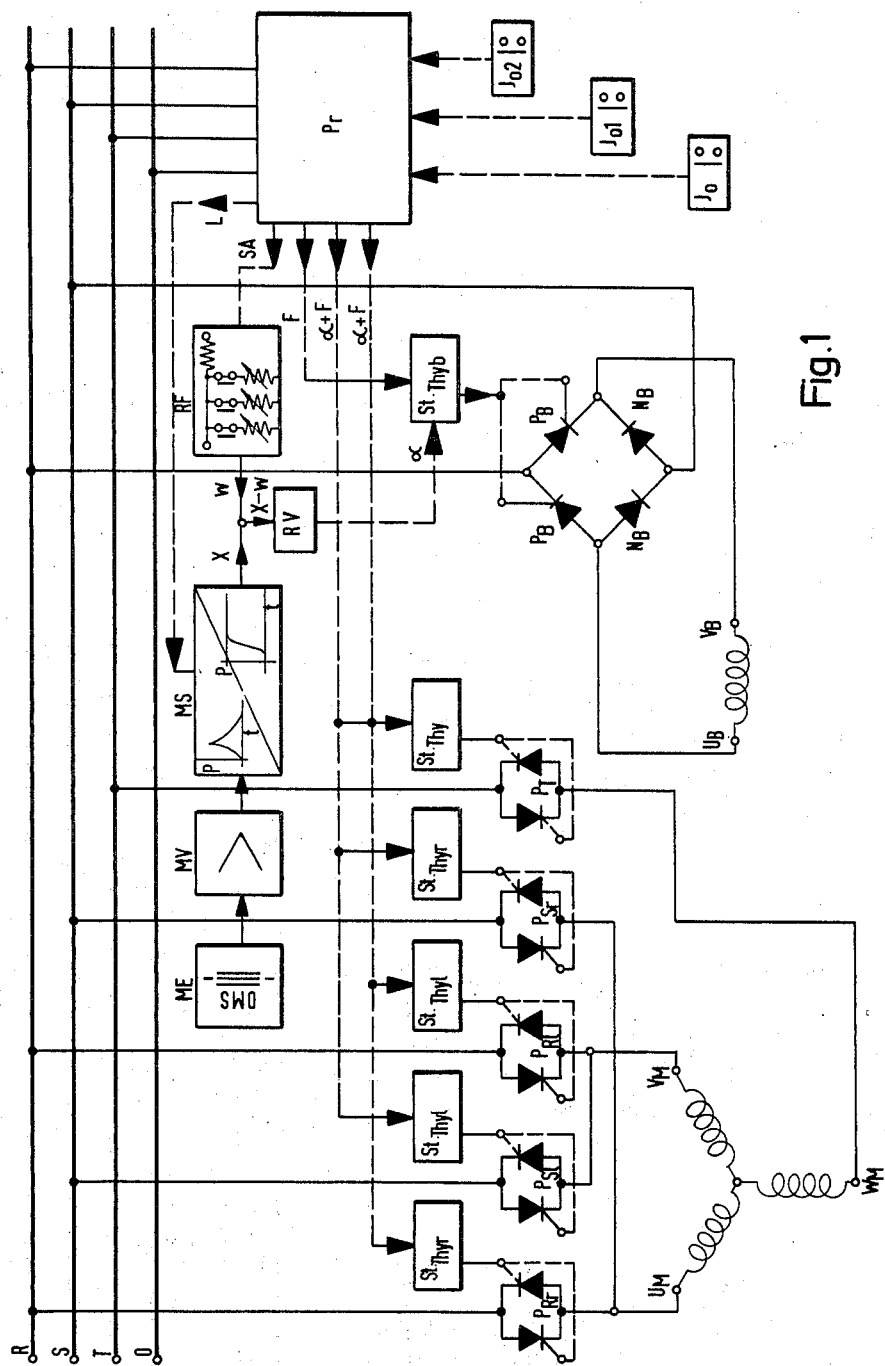

United States Patent [19]
Dorr

[11] 3,803,467
[45] Apr. 9, 1974

[54] MOTOR AND CONTROLLING DEVICE FOR AN IMPACT PRESS

[75] Inventor: Walter Dorr, Heilbronn, Neckar, Germany

[73] Assignee: Firma Glaser, von Praun, Osthofen, Germany

[22] Filed: Apr. 10, 1973

[21] Appl. No.: 349,721

[30] Foreign Application Priority Data
Apr. 14, 1972 Germany............................ 2218206
Mar. 3, 1973 Germany............................ 2312969

[52] U.S. Cl. ............. 318/203 R, 318/210, 318/266, 318/467
[51] Int. Cl. ............................................ H02p 1/40
[58] Field of Search ................... 318/203, 209–212, 318/227, 266, 267, 467, 468

[56] References Cited
UNITED STATES PATENTS
3,286,148  11/1966  Henderson...................... 318/203 R
3,353,077  11/1967  Egglestone et al................. 318/212

*Primary Examiner*—Gene Z. Rubinson
*Attorney, Agent, or Firm*—Fleit, Gipple & Jacobson

[57] ABSTRACT

This invention relates to a motor and motor control device for a high speed impact press and for obtaining a defined impact force combined with a predetermined impact time, in which the motor has main windings and retarding means, and in which, for adjusting the impact force, the main windings of the motor for both running directions are connected via controlled thyristors and the retarding means are connected via a rectifier bridge controlled by thyristors to the mains supply. According to one aspect of the invention the press impact force is controlled by measuring the impact force and comparing the measurement with a rated value, determining the deviation of the force from the rated value, and accurately controlling the thyristors in dependence on this deviation. According to a second aspect of the invention the retarding means comprises two series-connected main windings of the motor and the rectifier bridge is fully controlled by the thyristors thereof.

8 Claims, 2 Drawing Figures

MOTOR AND CONTROLLING DEVICE FOR AN IMPACT PRESS

This invention relates to a motor and motor control device for a high speed impact press and for obtaining a defined impact force combined with a predetermined impact time, in which the motor has main windings and retarding means, and in which, for adjusting the impact force, the main windings of the motor for both running directions are connected via controlled thyristors and the retarding means are connected via a rectifier bridge controlled by thyristors to the mains supply. By accurately controlling the thyristors, this device can provide an accurately defined impact force with the shortest possible impact time. A control device of this kind is described in our U.K. Pat. No. 1,245,327.

The present invention aims to modify and, in particular, to simplify the arrangement described in U.K. Pat. No. 1,245,327.

The present invention also aims to provide means whereby the arrangement described in U.K. Pat. No. 1,245,327 can be improved to obtain an even more accurately defined impact force.

According to a first aspect of the invention there is provided a device of the kind described, including means for pre-setting a desired rated value of impact force of the press; means for measuring the impact force of the press; and comparator means for comparing the measured and rated impact forces of the press and for effecting supply of correction signals to at least some of the thyristors in dependence on the deviation of the measured force from the rated force. Preferable retarding means is a retarding winding connected to said rectifier bridge, and then the comparator means is connected to means for effecting supply of said correction signals to the thyristors of said rectifier bridge.

By measuring the impact force, and comparing the measured value with the rated value, the deviation of the impact force from the rated value is determined and the control of the thyristors for the next stroke is altered in accordance with the deviation between the rated and actual values. In the course of practical use of a device described in the said U.K. Pat. No. 1,245,327, it was found that errors due to temperature and voltage changes could indeed be greatly reduced by compensation in controlling the thyristors, but in the complex system of an impact press there remained a residual inaccuracy that for many products is relatively great. The present invention can reduce or remove this inaccuracy.

In accordance with a second aspect of the invention, said retarding means comprise two series-connected main windings of the motor and all the rectifiers of the rectifier bridge are fully controlled by said programme control means. While the motor is in operation and being retarded the zero line of the mains can be connected to the star point and can otherwise be switched off.

For an optimum control of the impact force, it is advantageous to have at one's disposal the entire control-range of the device. The device of U.K. Pat. No. 1,245,327 is limited to a control angle of up to 60°, since the 120° displacement in the three-phase current mains means that only one pair of thyristors conducts and it is not until above this 60° control-angle that a current-flow comes into existence. This current, in each case according to the cos $\phi$ of the motor and up to about a 90° control angle, has a lot of gaps and therefore causes the motor to run unsmoothly and vibratingly. If on the other hand one connects the star point of the motor with the zero conductor of the supply mains in a device according to the second aspect of the invention, then even under the 60° control angle, current can flow through the zero mains line and the motor runs smoothly even with the smallest control signals. The setting of the compressive force of the percussion press can be carried out continuously with the star point connected to the zero line.

Furthermore it was found that with correct circuit-arrangement of the main motor windings practically the same eddy-current braking can be achieved as those obtained with a retarding winding provided solely for that purpose.

Figure 2:
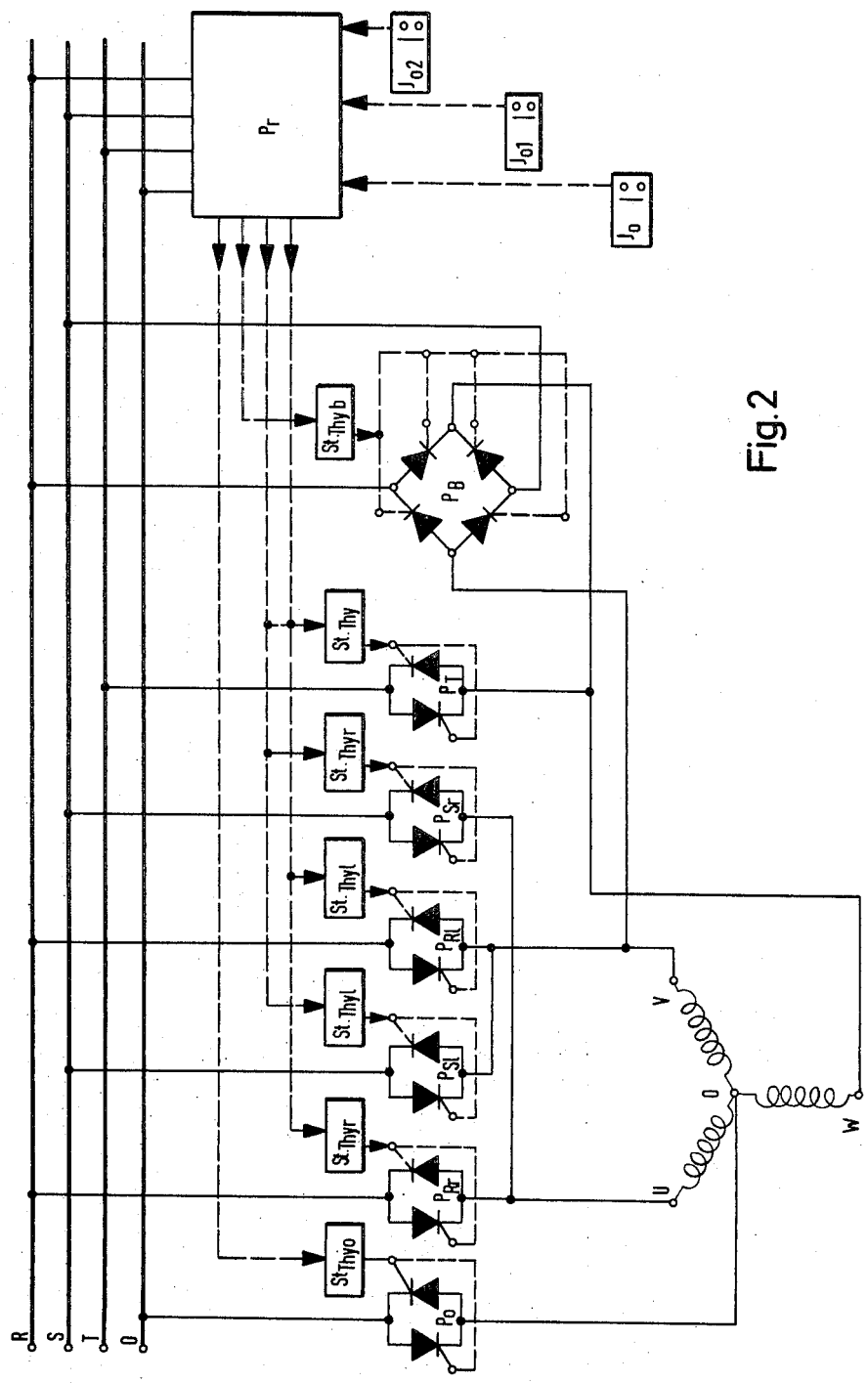

Preferred and illustrative embodiments of the invention will now be explained in more detail with reference to the accompanying drawings, in which:

FIG. 1 shows a circuit diagram of a motor and controlling device according to the invention, and FIG. 2 shows another aspect of the invention.

Referring firstly to FIG. 1, R, S, T are the three phases of mains supply. $P_{Rr}$, $P_{Sr}$ are two pairs of thyristors of the R-phase and the S-phase for one running direction of a motor having $U_M$, $V_M$, $W_M$ three-phase windings. $P_{R1}$, $P_{S1}$ are corresponding pairs of thyristors for the opposed running direction of the motor and $P_T$ indicates a pair of thyristors of the T-phase. $P_B$ and $N_B$ is a thyristor-controlled rectifier bridge and $U_B$, $V_B$ is a retarding winding of the motor. $St_{Thur}$ and $St_{Thul}$ are controlling instruments for the thyristors which govern the running direction of the motor. They include compensation circuits compensating for temperature and voltage variations and are not shown in detail. A preset programme Pr and switches $I_U$, $I_{01}$ and $I_{02}$ switches are arranged on the press frame (not shown) in the path of travel of the press ram. The preset programme is switched by the consecutive switches and is connected to the thyristors $P_{Rr}$, $P_{Sr}$, $P_{R1}$, $P_{S1}$ and $P_B$ via thyristor controls $St_{Thur}$ and $St_{Thul}$. The drive arrangement will be explained in detail with reference to a preset working cycle including three impacts. Such a cycle is required in connection with ceramic industries when the moldable material is to be de-aired by a soft impact, subsequently precompressed by a stronger impact, and finally pressed with full impact energy into a desired form.

At the beginning of the cycle the ram of the press is positioned slightly above switch $J_{01}$. The thyristors for the downward direction, e.g. thyristors $P_{Rr}$, $P_{Sr}$, conduct and the ram is accelerated downwardly. When the ram passes the switch $J_0$, these thyristors are switched off and the retarding thyristors $P_B$ conduct so that the ram is retarded in a defined manner and strikes the molding material with the desired impact energy. Switch $J_0$ switches on a timing element which blocks the retarding thyristors $P_B$ after a defined time interval and causes the thyristors $P_{R1}$, $P_{S1}$ for the opposite running direction to conduct. The ram is now returned with the maximum possible acceleration upwards until it passes the switch $J_{01}$. The thyristors $P_{R1}$, $P_{S1}$ are switched off and the retarding thyristors are made conducting. At the same time a timing element is switched on and after a predetermined time interval switches off the retarding thyristors and causes the thyristors $P_{Rr}$, $P_{Sr}$ to conduct. Consequently the ram reverses its running direction and again accelerates downwardly until it is again retarded after passing switch $J_0$, when the timing element for stopping the retardation and for commencing the return movement of the ram is switched on. It is of course possible to preset the motor and retarding thyristors to a different value for the second impact than for the first impact so that the impact forces can be adapted to the requirements of the pressing process. After the time interval controlled by the timing element the thyristors $P_{S1}$, $P_{R1}$, for the returning movement of the ram are made to conduct so that the ram returns with the maximum possible acceleration upwards until it reaches switch $J_{02}$. In the same way as switch $J_{01}$, this switch switches off the thyristors $P_{S1}$, $P_{R1}$ for the upward direction and causes the retarding thyristors to conduct. Additionally, the switch $J_{02}$ effects the switching on of a timing element for switching off the retarding thyristors and for causing the thyristors $P_{Rr}$, $P_{Sr}$ to conduct after a defined time interval is effected. Therefore, at a position defined by switch $J_{02}$, the ram reverses its moving direction and now performs its third impact. As this will be a very heavy impact the ram is not retarded electrically when reaching switch $J_0$. However, switch $J_0$ causes the running direction of the motor to be reversed. Consequently the ram is returned in its original position.

The circuit described above is also described in our U.K. Pat. No. 1,245,327.

According to a first embodiment of the present invention, this circuit is improved so that the impact force of the press can be controlled even more accurately. For this purpose, additional controlling means are added to the described circuit and these are also shown in FIG. 1. Referring to this Figure, a measuring device ME is arranged below the press mould in the press frame and determines the impact force of the press. Resistance strain gauges are preferably used in the measuring device. These are glued at points on the press frame where the expansion of the frame is proportional to the percussive force. Of course other measuring devices that are able to measure the percussive force can also be used. An amplifier MV amplifies signals from the measuring device and supplies the amplified signals to a storage device MS having a memory to store these signals. The memory can be actuated or erased by signals from the programme control Pr. A reference unit RF, which can be switched by the programme control, is connected between an output of the programme control and the storage device MS. The reference unit can be set to emit signals proportional to a desired, rated impact force of the press. Comparator means RV comprises a branch line connected at one end to between the device MS and the unit RF and includes a regulator amplifier and matching adaptor. The other end of the branch line is connected to the thyristor $St_{Thub}$ for controlling the thyristors $P_B$ of the rectifier bridge. This adjusts the retarding effect of the winding of the motor in dependence on a correction signal produced as a result of the variation between the rated and actual values of the percussion in force.

The rated-actual value comparison acts here on the thyristors $P_B$ for the retarding winding during the downward strokes of the press, as these phases of the working cycle are mainly responsible for the exact intensities of percussion. The working principle of the press is similar to that described above. However, the method of operation is varied by inserting at the end of, for example, the third ram stroke, a braking phase that is dependent on the difference between the rated and actual values of previous strokes.

In the drawing, the control signals are represented by reference letters adjacent appropriate lines. $\alpha$ represents the difference signal controlling the position or angle of the motor when the retarding winding is initiated, F represents the signals controlling the thyristors, and SA represents the signals for initiating supply of a rated value signal to the regulator amplifier and the matching adapter RV from the unit RF and supply of a measured value signal from storage device MS, enabling the signal $\alpha$ to be obtained.

The motor working phases can be influenced in the different strokes by the difference between the rated and actual values of the intensity of percussion. Such influencing would, however, only make conditions difficult, without it being possible to gain any significant additional advantages.

According to a second embodiment of the invention the circuit initially described above is simplified, and the simplified circuit is shown in FIG. 2.

In this Figure, R, S, T, O, are again the mains input lines and $P_{Rr}$, $P_{Sr}$, $P_{Rl}$, $P_{Sl}$, and $P_T$ again designate the thyristors for controlling the running of the motor. U, V and W designate the three inputs of the main motor windings and its star point is indicated by O'. The rectifier bridge of FIG. 1 has been replaced by a bridge including four braking thyristors, and star point thyristors $P_o$ connect the star point O' to the lines O. The thyristor controls for the running, braking and star point thyristors are indicated by $St_{Thyr}$, $St_{Thyl}$, $St_{ThyB}$, and $St_{Thyo}$. Finally, $P_r$ again designates the programme control for the press, and $I_U$, $I_{o1}$ and $I_{o2}$ designate the switches arranged on the press frame. The retarding winding of the initially described circuit has been removed and the outputs from the rectifier bridge are connected to the inputs V and W of the motor windings instead of to the retarding winding. The windings VO' and WO' are thus used for retarding the motor when needed.

The functioning of the arrangement is largely the same as initially described but, during the retarded operation of the motor only, the motor star point is connected to the zero line of the supply mains via the switching thyristors $P_0$. Furthermore the thyristor bridge, for producing the braking current, is fully controlled by the thyristor control $St_{Thyb}$. The modification according to the second aspect of the invention can also be applied to the complete circuit of FIG. 1.

What is claimed is:

1. A motor and motor control device for a high speed impact press, comprising:

a motor having main windings and retarding means;

controlled thyristors connected to the main windings to transmit mains current for both running directions of the motor to said main windings in response to control signals supplied thereto;

a thyristor-controlled rectifier bridge connected to said retarding means for transmitting mains current thereto in response to control signals supplied to the thyristors of the bridge;

programme control means for supplying control signals to said thyristors;

means for pre-setting a desired rated value of impact force of the press;

means for measuring the impact force of the press; and comparator means for comparing the measured and rated impact forces of the press and for effecting supply of correction signals to at least some of the thyristors in dependence on the deviation of the measured force from the rated force.

2. A device according to claim 1, wherein the comparator means is connected to means for effecting supply of said correction signals to the thyristors of said rectifier bridge.

3. A device according to claim 1, further comprising a storage device for storing signals produced by the measuring means, said programme control means being connected to means for supplying control signals from the programme control means to the thyristors and being connected to the storage device for actuating the storage device and for erasing signals stored therein.

4. A device according to claim 1, wherein said retarding means comprises a retarding winding connected to said rectifier bridge.

5. A device according to claim 1, wherein said retarding means comprises a pair of series connected windings of said motor, said windings being connected to said rectifier bridge and each rectifier of said rectifier bridge comprising a thyristor.

6. A device according to claim 1, including a controlled thyristor connected to the star point of said motor for conductively connecting the zero line of the mains current supply to said star point during retarded operation of said motor.

7. A motor and motor control device for a high speed impact press, comprising: a motor having main windings and retarding means; controlled thyristors connected to the main windings to transmit mains current for both running directions of the motor to said main windings in response to control signals supplied thereto; a thyristor-controlled rectifier bridge connected to said retarding means for transmitting mains current thereto in response to control signals supplied to the thyristors of the bridge; programme control means for supplying control signals to said thyristors; said retarding means comprising two series-connected main windings of the motor and all the rectifiers of the rectifier bridge being controlled by said programme control means.

8. A device according to claim 7 including a controlled thyristor connected to the star point of said motor for conductively connecting the zero line of the mains current supply to said star point during retarded operation of said motor.

* * * * *